Feb. 11, 1958     F. O. WISMAN     2,822,906
CLUTCH WITH LEAF SPRING KEY

Filed Aug. 11, 1953     3 Sheets-Sheet 1

INVENTOR.
FRANKLIN O. WISMAN
BY Cecil J Arens

ATTORNEY

Feb. 11, 1958  F. O. WISMAN  2,822,906
CLUTCH WITH LEAF SPRING KEY
Filed Aug. 11, 1953  3 Sheets-Sheet 2
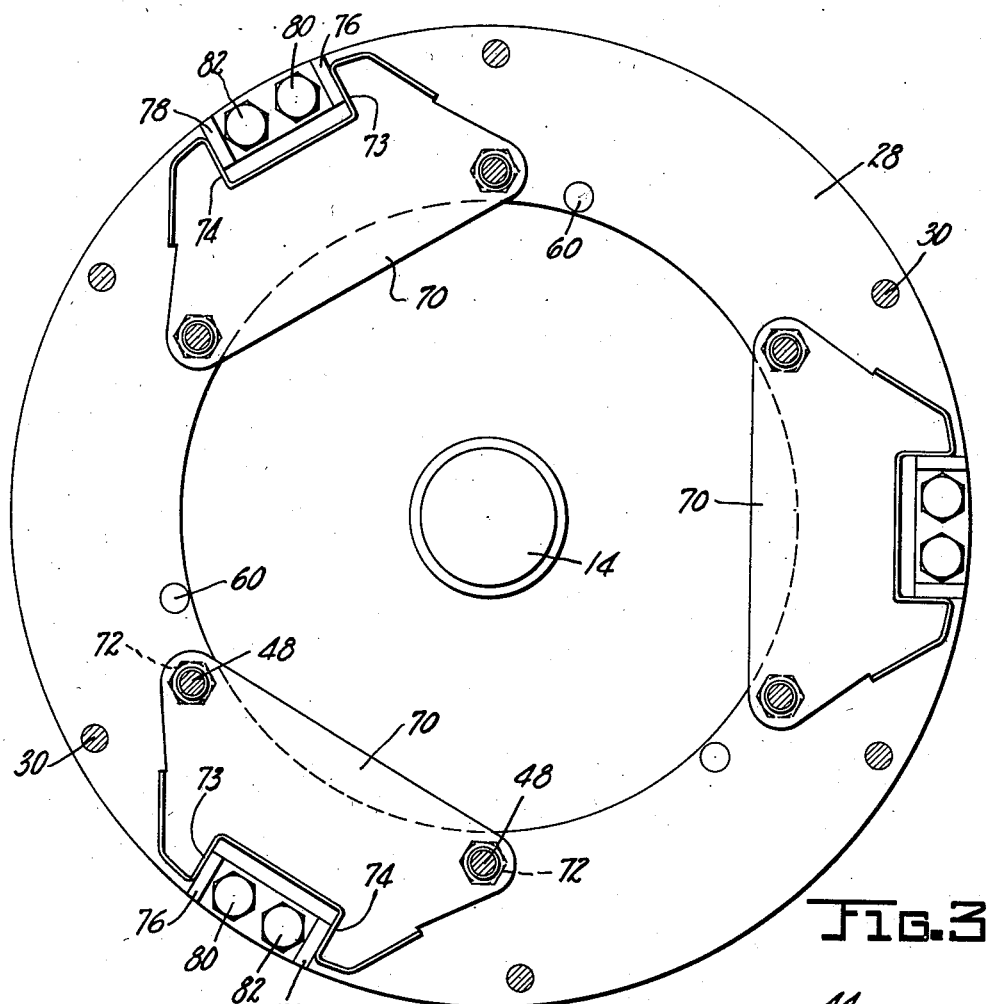
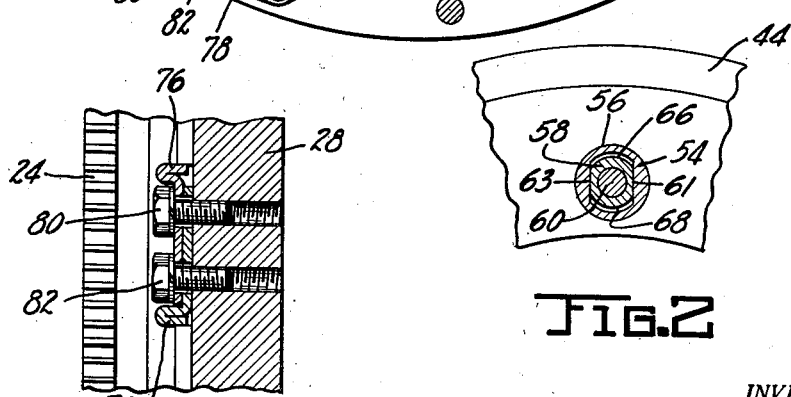
INVENTOR.
FRANKLIN O. WISMAN
BY Cecil J Arena
ATTORNEY United States Patent Office 2,822,906
Patented Feb. 11, 1958

2,822,906

CLUTCH WITH LEAF SPRING KEY

Franklin O. Wisman, South Bend, Ind., assignor to Bendix Aviation Corporation, South Bend, Ind., a corporation of Delaware Application August 11, 1953, Serial No. 373,636

12 Claims. (Cl. 192—84)

This invention relates to clutches, and more particularly to magnetic clutches.

The invention is especially adaptable to a clutch of the type described in my copending Patent No. 2,774,452, issued December 18, 1956. The clutch described in that patent consists, essentially, of coaxial driving and driven discs together with an axially movable, magnetically actuated pressure pad carried by the driving disc to effectuate frictional engagement between the discs. One of the major difficulties encountered in the refinement of this clutch to a point where it was capable of practical commercial use was in the provision of means which would allow free axial movement of the pressure pad and, at the same time, prevent relative rotation between the pressure pad and the driving disc during clutch engagement.

In a conventional mechanical clutch of the jaw type, for example, rotation between the pressure pad and driving disc during clutch engagement is prevented by cooperating abutments. However, in a magnetic clutch cooperating abutments have proved to be entirely unsatisfactory. The pressure pad of a magnetic clutch, in its last increment of axial movement, has already started to engage the driven disc so that the reaction force thus produced would cause friction between cooperating abutments and impede free axial movement of the pressure pad. The magnetic force acting on the pressure pad would then have to build up to a point where it was capable of overcoming the aforesaid friction. At this point the magnetic force would be of such high magnitude that clutch engagement would be almost instantaneous and control of the clutch would be impaired. Obviously, the almost instantaneous application of high torque on the output shaft is very undesirable in any sort of torque transmitting means.

It is, therefore, an object of the invention to provide a friction type magnetic clutch capable of smooth uninterrupted engagement.

Another object of the invention is to provide means in a magnetic clutch which will prevent relative rotation between the pressure pad and driving disc of the clutch and at the same time allow free axial movement of the pressure pad.

The above and other objects and features of the invention will become apparent from the following description of the apparatus taken in connection with the accompanying drawings which form a part of this specification, and in which:

Figure 2 is a sectional view taken along the line 2—2 of Figure 1 showing a cross section of the lug mechanism of the clutch;

Figure 3 is an elevational view of the leaf springs of the clutch;

Figure 4 is a view along the outer periphery of the clutch looking radially inward and showing the drive lugs associated with the leaf springs;

Figure 1:
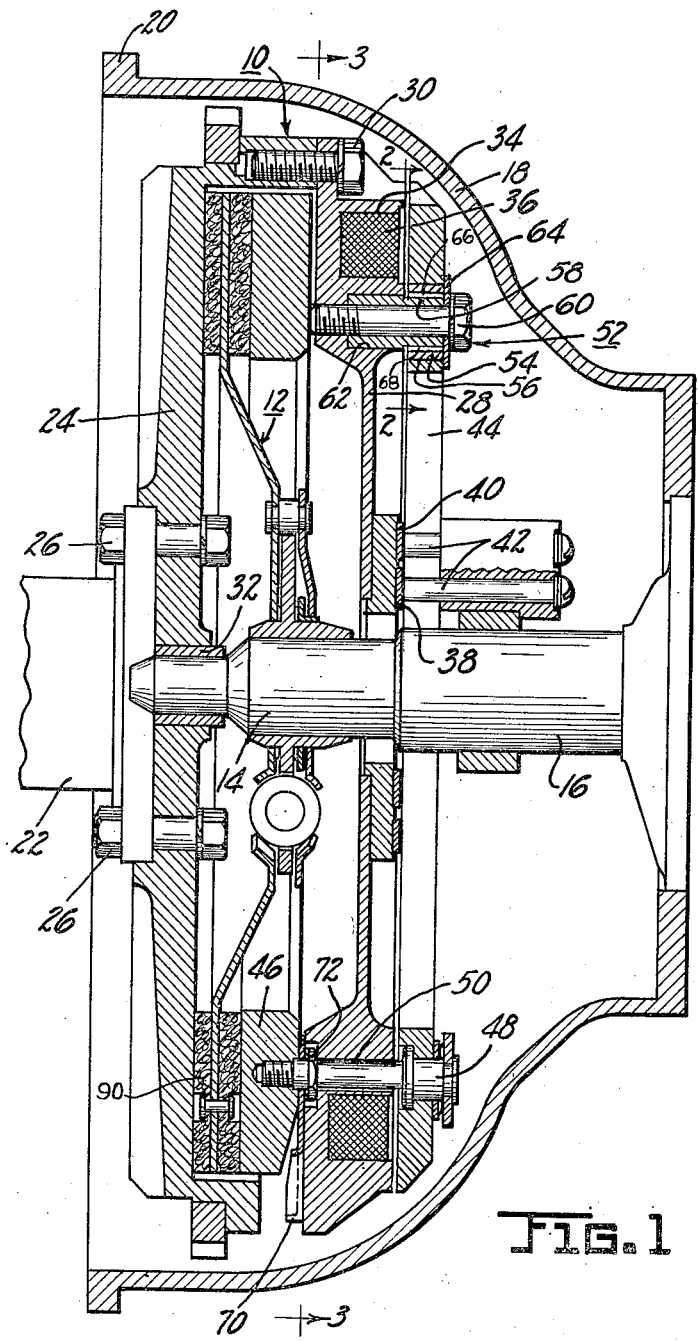
Figure 1 is a section taken along the axis of the clutch.

Referring to Figure 1, the clutch comprises essentially a driving member 10 and a driven member 12, the latter of which is splined to an output shaft 14 carried in sleeve 16. Sleeve 16 is fastened to housing 18; and housing 18 is, in turn, securely fastened to a stationary member at its outer periphery, indicated at 20. The driving member 10 includes a drive shaft 22, a fly-wheel 24 secured thereto by bolts 26, and a magnet core 28 fastened to the outer periphery of the fly-wheel by bolts 30. A bearing 32, journaled in fly-wheel 24, carries one end of shaft 14 and permits relative rotation between the fly-wheel and output shaft. An annular groove 34 is formed in one face of magnet core 28 to receive a coil or winding 36 which is connected to any suitable source of electrical current, not shown, through slip-rings 38 and 40 on which ride carbon brushes 42. Energization of the winding 36 attracts an armature 44 which, in turn, is operatively connected to an annular pressure pad 46 by adjustable jack screws 48 which pass through openings 50 in the magnet core and threadedly engage the pressure pad. The adjustable feature of the jack screws forms no part of the present invention and is described and claimed in my copending Patent No. 2,774,452.

The armature 44 and the pressure pad 46 are both drivably connected to one of the constituent parts of the driving member 10 and, in effect, become a part thereof. The armature 44 is drivably connected to magnet core 28 by means of lug mechanisms 52 circumferentially spaced around the clutch. The lug mechanism shown in Figures 1 and 2 includes a collar 54 positioned within a bore 56 formed within the armature, and a drive-pin 58 slidably received within a slot in collar 54. A bolt 60, threadedly engaging magnet core 28, serves to hold the drive-pin 58 securely against the bottom of hole 62 formed in the magnet core. A washer 64, interposed between drive-pin 58 and the head of bolt 60 serves as an abutment for limiting axial movement of the armature to the right as shown in Figure 1.

Referring to Figure 2, it can be seen that the radially extending sides 61 and 63 of the drive-pin 58 are flat whereas its circumferentially extending sides are rounded. This configuration of the drive-pin becomes necessary due to the differential heating effect in the armature and magnet core. It has been found that under actual operating conditions the heat caused by slippage between the pressure plate and friction material during clutch engagement is transferred to the magnet core much more effectively and readily than to the armature with the result that the magnet core expands more quickly than the armature. Compensating for this differential of expansion by the obvious method of employing a circular lug having a smaller diameter than its associated bore in the armature has been found unsatisfactory and impractical since the space left around the entire circumference of the drive-pin causes rattling between the armature and magnet core. The present drive-pin, therefore, compensates for the differential of expansion by spaces 66 and 68 left in the top and bottom of collar 54 and, at the same time, provides a snug fit at all times along the radially extending or torque-transmitting sides of the drive-pin.

The pressure pad 46 is drivably connected to the magnet core 28 by leaf springs 70 as best shown in Figure 3. The employment of the leaf springs in a manner hereinafter described comprises the principal part of this invention. The springs are arranged circumferentially about the pressure pad 46 and are held thereto by means of nuts 72 which are threaded onto the jack screws 48 (Figure 1.) Shoulders 73 and 74 formed in the radially-outwardly extending ends of the leaf springs abut adjustable drive lugs 76 and 78 respectively.

In Figure 4 it can be seen that the drive lugs 76 and 78 overlap each other to form a single composite projection. Both are loosely fitted around bolts 80 and 82 to permit convenient adjustment of the two. In assembling the clutch, leaf springs 70 are first positioned around pressure pad 46; jack screws 48 are then threaded into the pressure pad and nuts 72 are adjusted so that the leaf springs are securely held against the pressure pad; finally, drive lugs 76 and 78 are positioned so as to effect a snug abutment between the lugs and leaf springs. The adjustable feature of the drive lugs thereby avoids the necessity of close tolerances between the drive lugs and the leaf springs in order to effectuate a snug fit which is necessary to avoid the rattling effect in clutch engagement referred to above.

Figure 5:
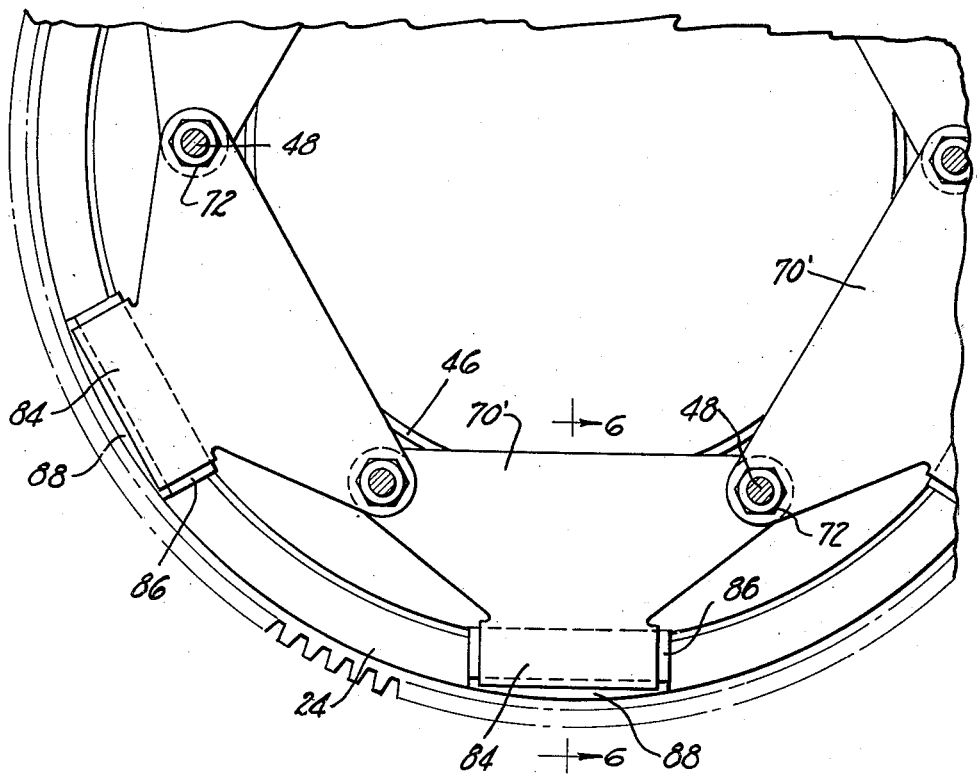
Figure 5 is an elevational view of a modified form of the leaf springs.
Figure 6:
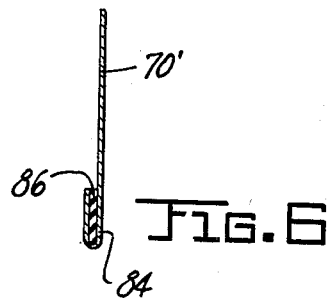
Figure 6 is a cross-sectional view of the modified form of the leaf springs taken along line 6—6 of Figure 5.

Referring to Figures 5 and 6, the leaf springs 70' are shown in a modified form which is substantially the same as the form shown in Figure 3 except that the radially outwardly extending ends of the leaf springs are now bent at 84 to form a channel for receiving a lug 86. Note that Figure 5 shows pressure pad 46 and flywheel 24, whereas Figure 3 was taken in the opposite direction to show magnet core 28. The lugs are spotwelded or otherwise securely fastened within their associated channels. They are slidably fitted into a series of slots 88 formed in the outer periphery of flywheel 24 to thereby facilitate axial movement of pressure pad 46. In constructing the clutch, the leaf springs are first fastened to pressure pad 46 by means of nuts 72. The pressure pad is then aligned with flywheel 24 so that the channeled portions 84 lie within slots 88. After the channeled portions are positioned within the slots, lugs 86 are inserted into the channels and spotwelded thereto. By using this procedure the necessity of holding close tolerances between the lugs and their associated slots is eliminated, as it was in the first embodiment shown, since the lugs can be positioned within the channels after the pressure pad is aligned with the flywheel.

When coil 36 is energized, a magnetic field is set up which forces the combination of armature 44, jack screws 48 and pressure pad 46 to the left, as shown in Figure 1, to thereby frictionally engage lining material 90 on driven member 12 and transmit torque to the driven shaft 14. In doing so a reaction torque is set up which tends to force jack screws 48 against one side of opening 50. Leaf springs 70 prevent contact between the jack screws and their associated openings which would otherwise impede, if not prevent, free axial motion of the pressure pad 46. It will be noted that the leaf spring has an advantage over a stiff torque transmitting connection between the pad and magnet core which would not allow free axial motion. That is, where large torques are transferred from the driving member to the pressure pad, friction between a lug on the pressure pad and its associated abutment on the driving member would be considerable, thus acting as a deterrent to the axial movement of the pressure pad in the last stages of clutch engagement. By employing the leaf springs which have flexibility, the pressure pad in its last increment of travel is allowed easy axial movement. Thus, the problem of rough engagement and loss of control in a magnetic clutch is overcome.

When coil 36 is de-energized, the clutch is naturally disengaged by vibrational forces acting on pressure pad 46 without the aid of any sort of return spring device; although springs may be used if desired.

Although this invention has been described with certain specific embodiments it is not limited thereto and the principles set out are susceptible of numerous other applications as will readily appear to persons skilled in the art.

Having thus described the various features of the invention what I claim as new is:

1. A clutch comprising a flywheel connected to a driving shaft, an annular magnet core fastened at its outer periphery to said flywheel to form a substantially cylindrical chamber between the flywheel and magnet core, a driven member for the clutch comprising a friction disc carried within said chamber, a pressure pad within said chamber arranged for frictional engagement with said friction disc, an annular armature operatively associated with said magnet core, means connecting the armature and pressure pad whereby said pressure pad will frictionally engage said driven disc upon energization of the magnet core to attract said armature, circumferentially disposed drive pins carried by the magnet core and extending through apertures in the armature to prevent relative rotation between the armature and magnet core, said apertures allowing for differential radial expansion between the armature and magnet core, radially extending, axially resilient elements circumferentially disposed on the pressure pad for preventing relative rotation between the pressure pad and magnet core during frictional engagement of the pressure pad and driven disc, said elements including radially extending ends, and a plurality of lugs positioned at the outer periphery of said flywheel for engaging said extending ends.

2. For use in a circular clutch having a driving member and a driven member and electrically controlled means carried by the driving member for causing frictional engagement between said members, means fastened to said electrically controlled means for transmitting torque from the driving member to the driven member during clutch engagement, said torque-transmitting means including a series of radially outwardly extending and axially resilient elements circumferentially distributed on said electrically controlled means and a series of adjustable lugs positioned on the outer periphery of said driving member, the radially outwardly extending ends of said elements being formed to engage said lugs, and means allowing for differential radial expansion between the driving member and the electrically controlled means but preventing relative rotation therebetween.

3. For use in a clutch having a driving member comprising two abutting disc-like parts to form a substantially cylindrical chamber therebetween and a driven member carried in said cylindrical chamber, electrically controlled means for causing frictional engagement between said members, said means including a circular pressure pad having a plurality of axially resilient, radially extending plates attached thereto, each of said plates having two oppositely facing shoulders formed in its radially outwardly extending end, and a plurality of lugs positioned at the outer periphery of said driving member for engaging said oppositely facing shoulders, each of said lugs having two adjustable end portions abutting said shoulders.

4. For use in a clutch having a driving member and a driven member and electrically controlled means carried by the driving member for causing frictional engagement between said members, means for limiting relative rotation between the driving member and the electrically controlled means during said frictional engagement, said means including a plurality of lugs positioned on said driving member and a plurality of axially resilient elements circumferentially spaced on the electrically controlled means, said elements drivably engaging said lugs positioned on the driving member, and means for transmitting torque from the driving member to the electrically controlled means, said torque transmitting means allowing for differential radial expansion between the driving member and the electrically controlled means.

5. For use in a clutch having a driving member and a driven member and electrically controlled means carried by the driving member for causing frictional engagement between said members, said electrically controlled means including an annular pressure pad, means for limiting relative rotation between the driving member and the electrically controlled means during said frictional engagement including a plurality of axially resilient elements circumferentially spaced on the annular pressure pad and a plurality of lugs positioned on said driving member for driving engagement with said resilient elements, said axially resilient elements allowing differential radial expansion between the driving member and electrically controlled means.

6. In combination with driving and driven shafts, a magnetic clutch for transmitting torque from the driving to the driven shaft including an annular magnet core, an armature including a pressure pad for use with the magnet core, means drivably connected to the armature for effecting frictional engagement between said shafts, and means for prohibiting relative rotation between the pressure pad and magnet core but permitting differential radial expansion therebetween, said second named means comprising a plurality of lugs and a plurality of radially extending resilient elements formed with shoulders at their extremities, said shoulders slidably abutting said lugs.

7. In a clutch having driving and driven members, frictionally engageable elements respectively rotatable with said members, magnetically controlled means for connecting the members for rotation including one of said elements, torque transmitting means connecting said one element to its associated member comprising a plurality of radially extending projections fixed to and spaced apart around the circumference of said one element, said associated member being provided with means to effect driving engagement with said projections, said projections being slidable on said last mentioned means and flexible in a direction which permits said one element to have axial movement under torque loads.

8. For use in a clutch having a driving member and a driven member and electrically controlled means for causing frictional engagement between said members, said electrically controlled means including an annular pressure pad, and said driving member including slots formed in its outer periphery, means for limiting relative rotation between the driving member and the electrically controlled means during said frictional engagement, said means including a plurality of axially flexible elements circumferentially spaced on the annular pressure pad, said elements having radially outwardly extending ends extending into said slots formed in the outer periphery of said driving member.

9. For use in a clutch having driving and driven shafts and electrically controlled means for controlling frictional engagement between the shafts, said electrically controlled means including an annular pressure pad, means for preventing relative rotation between the driving shaft and the electrically controlled means comprising axially flexible elements carried by the annular pressure pad, said elements having radially extending portions slidably connected with and drivably engaging said driving shaft.

10. A clutch including driving and driven members, a magnetic device comprising an armature carried by one of the members, a pressure pad drivably related to said armature to be actuated thereby for frictional engagement with said other member, a plurality of resilient torque taking elements connecting said pressure pad to said one member, and a series of adjustable lugs positioned on the outer periphery of said one member, said elements having a fixed connection with said pressure pad and a sliding connection with said lugs of said one member to provide for axial movement of said pressure pad.

11. A clutch comprising a flywheel connected to a driving shaft, an annular magnet core fastened at its outer periphery to said flywheel to form a substantially cylindrical chamber between the flywheel and magnet core, a driven member for the clutch comprising a friction disc carried within said chamber, a pressure pad within said chamber arranged for frictional engagement with said friction, disc, an annular armature operatively associated with said magnet core, means connecting the armature and pressure pad whereby said pressure pad will frictionally engage said driven disc upon energization of the magnet core to attract said armature, circumferentially disposed drive pins carried by the magnet core and extending through apertures in the armature to prevent relative rotation between the armature and magnet core, said apertures having two torque transmitting parallel sides which snugly abut said drive pins, said drive pins being located in the apertures so as to leave two radially spaced openings between the drive pins and the armature thereby permitting differential radial expansion, and radially extending axially resilient elements having radially extending shoulders thereon circumferentially distributed on the pressure pad and a plurality of lugs positioned on the magnet core for engaging said extending shoulders.

12. A clutch comprising a flywheel connected to a driving shaft, an annular magnet core fastened at its outer periphery to said flywheel to form a substantially cylindrical chamber between the flywheel and magnet core, a driven member for the clutch comprising a friction disc carried within said chamber, a pressure pad within said chamber arranged for frictional engagement with said friction disc, an annular armature operatively associated with said magnet core, adjustable jack screws connected to the armature and pressure pad whereby said pressure pad will frictionally engage said driven disc upon energizatoin of the magnet core to attract said armature, circumferentially disposed drive pins carried by the magnet core and extending through apertures in the armature, said apertures having two flat parallel sides and two arcuate surfaces, said drive pins also having two flat parallel sides which abut the parallel sides of said apertures and two arcuate surfaces of lesser radius than the arcuate surfaces of said apertures thereby forming spaces between the drive pins and armature which permit differential radial expansion, and axially resilient elements having radially extending ends thereon circumferentially disposed on the pressure pad and a plurality of lugs positioned on the magnet core for engaging said extending ends.

References Cited in the file of this patent
UNITED STATES PATENTS

| Number | Name | Date |
|---|---|---|
| 1,488,497 | Higgins | Apr. 1, 1924 |
| 2,070,813 | Stearns et al. | Feb. 16, 1937 |
| 2,097,922 | Hodgson | Nov. 2, 1937 |
| 2,101,671 | Cooper | Dec. 7, 1937 |
| 2,277,557 | Nutt | Mar. 24, 1942 |
| 2,589,308 | Thelander | Mar. 18, 1952 |
| 2,672,965 | Miller | Mar. 23, 1954 |